United States Patent
Yang et al.

(10) Patent No.: US 10,424,784 B2
(45) Date of Patent: Sep. 24, 2019

(54) NEGATIVE ELECTRODE INCLUDING SILICON NANOPARTICLES HAVING A CARBON COATING THEREON

(71) Applicant: GM GLOBAL TECHNOLOGY OPERATIONS LLC, Detroit, MI (US)

(72) Inventors: Li Yang, Troy, MI (US); Mei Cai, Bloomfield Hills, MI (US); Meng Jiang, Rochester Hills, MI (US); Martin S. Ruthkosky, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 210 days.

(21) Appl. No.: 15/337,780

(22) Filed: Oct. 28, 2016

(65) Prior Publication Data

US 2018/0123124 A1    May 3, 2018

(51) Int. Cl.
*H01M 4/36* (2006.01)
*H01M 4/38* (2006.01)
(Continued)

(52) U.S. Cl.
CPC ........... *H01M 4/366* (2013.01); *H01M 4/386* (2013.01); *H01M 4/621* (2013.01); *H01M 4/625* (2013.01);
(Continued)

(58) Field of Classification Search
None
See application file for complete search history.

(56) References Cited

U.S. PATENT DOCUMENTS

| 7,718,156 B2 | 5/2010 | Zhang et al. |
| 7,736,805 B2 | 6/2010 | Nazri et al. |

(Continued)

FOREIGN PATENT DOCUMENTS

| CN | 103779546 A | 5/2014 |
| CN | 104269559 A | 1/2015 |

(Continued)

OTHER PUBLICATIONS

Kobayashi, et al.; Silicon/soft-carbon nanohybrid material with low expansion for high copacity and long cycle life lithium-ion battery; Journal of Power Sources; 326; 2016; pp. 235-241.
(Continued)

*Primary Examiner* — Maria Laios
(74) *Attorney, Agent, or Firm* — Harness, Dickey & Pierce, P.L.C.

(57) ABSTRACT

An example of a negative electrode includes silicon nanoparticles having a carbon coating thereon. The carbon coating has an oxygen-free structure including pentagon rings. The negative electrode with the silicon nanoparticles having the carbon coating thereon may be incorporated into a lithium-based battery. In an example of a method, silicon nanoparticles are provided. A carbon precursor is applied on the silicon nanoparticles. The carbon precursor is an oxygen-free, fluorene-based polymer. Then the silicon nanoparticles are heated in an inert gas atmosphere to form the carbon coating on the silicon nanoparticles. The carbon coating formed on the silicon nanoparticles has an oxygen-free structure including pentagon rings.

20 Claims, 5 Drawing Sheets

(51) Int. Cl.
*H01M 4/62* (2006.01)
*H01M 10/0569* (2010.01)
*H01M 10/0525* (2010.01)

(52) U.S. Cl.
CPC .... *H01M 10/0569* (2013.01); *H01M 10/0525* (2013.01); *H01M 2300/0034* (2013.01); *H01M 2300/0037* (2013.01); *H01M 2300/0091* (2013.01)

(56) References Cited

U.S. PATENT DOCUMENTS

| | | | |
|---|---|---|---|
| 8,101,152 | B1 | 1/2012 | Halalay et al. |
| 8,399,138 | B2 | 3/2013 | Timmons |
| 8,420,259 | B2 | 4/2013 | Xiao et al. |
| 8,440,350 | B1 | 5/2013 | Verbrugge et al. |
| 8,642,201 | B2 | 2/2014 | Cheng et al. |
| 8,658,295 | B2 | 2/2014 | Cheng et al. |
| 8,679,680 | B2 | 3/2014 | Vanimisetti et al. |
| 8,828,481 | B2 | 9/2014 | Burton et al. |
| 8,835,056 | B2 | 9/2014 | Xiao et al. |
| 9,012,075 | B2 | 4/2015 | Verbrugge et al. |
| 9,034,519 | B2 | 5/2015 | Xiao et al. |
| 9,093,705 | B2 | 7/2015 | Xiao et al. |
| 9,142,830 | B2 | 9/2015 | Xiao et al. |
| 9,153,353 | B2 | 10/2015 | Liu et al. |
| 9,153,819 | B2 | 10/2015 | Huang et al. |
| 9,356,281 | B2 | 5/2016 | Verbrugge et al. |
| 9,362,551 | B2 | 6/2016 | Sachdev et al. |
| 9,362,552 | B2 | 6/2016 | Sohn et al. |
| 9,379,374 | B2 | 6/2016 | Liu et al. |
| 9,583,767 | B2 | 2/2017 | Verbrugge et al. |
| 2002/0009639 | A1 | 1/2002 | Miyake et al. |
| 2006/0127773 | A1* | 6/2006 | Kawakami ............ H01M 4/134 429/245 |
| 2008/0044735 | A1* | 2/2008 | Ryu .................... H01M 10/052 429/331 |
| 2009/0087731 | A1* | 4/2009 | Fukui .................... H01M 4/131 429/164 |
| 2009/0208780 | A1 | 8/2009 | Sun et al. |
| 2012/0077087 | A1* | 3/2012 | Cho ...................... H01M 4/133 429/219 |
| 2012/0100403 | A1 | 4/2012 | Wang et al. |
| 2012/0229096 | A1 | 9/2012 | Nazri |
| 2012/0328927 | A1 | 12/2012 | Timmons et al. |
| 2013/0099159 | A1 | 4/2013 | Halalay et al. |
| 2013/0323595 | A1 | 12/2013 | Sohn et al. |
| 2013/0330619 | A1 | 12/2013 | Archer et al. |
| 2016/0172665 | A1 | 6/2016 | Zhou et al. |
| 2017/0098817 | A1 | 4/2017 | Yu et al. |
| 2017/0141382 | A1 | 5/2017 | Dadheech et al. |
| 2017/0338490 | A1 | 11/2017 | Xiao et al. |
| 2018/0123124 | A1 | 5/2018 | Yang et al. |

FOREIGN PATENT DOCUMENTS

| | | |
|---|---|---|
| CN | 108023066 A | 5/2018 |
| DE | 102017124894 A1 | 5/2018 |
| KR | 20140135422 A | 11/2014 |
| WO | WO-2012064702 A2 | 5/2012 |

OTHER PUBLICATIONS

Gongshin Qi et al., U.S. Appl. No. 15/992,347, filed May 30, 2018 entitled "Silicon Anode Materials," 37 pages.

Jang Wook Choi et al., "Promise and reality of post-lithium-ion batteries with high energy densities", *Nature Reviews Materials*, vol. 1., Mar. 31, 2016, Art. No. 16013, 16 pages, doi:10.1038/natrevmats.2016.13.

Nian Liu et al., "A Yolk-Shell Dseign for Stabilized and Scalable Li-Ion Battery Alloy Anodes", *Nano Lett.* 2012, 12, 3315-3321; dx.doi.org/10.1021/nl3014814.

Xingcheng Xiao et al., "Regulated Breathing Effect of Silicon Negative Electrode for Dramatically Enhanced Performance of Li-Ion Battery", *Adv. Funct. Mater.* 2015, 25, 1426-1433, DOI: 10.1002/adfm.201403629.

* cited by examiner

NEGATIVE ELECTRODE INCLUDING SILICON NANOPARTICLES HAVING A CARBON COATING THEREON

Secondary, or rechargeable, lithium-based batteries are often used in many stationary and portable devices, such as those encountered in the consumer electronic, automobile, and aerospace industries. The lithium class of batteries has gained popularity for various reasons, including a relatively high energy density, a general nonappearance of any memory effect when compared to other kinds of rechargeable batteries, a relatively low internal resistance, and a low self-discharge rate when not in use. The ability of lithium batteries to undergo repeated power cycling over their useful lifetimes makes them an attractive and dependable power source.

SUMMARY

An example of a negative electrode includes silicon nanoparticles having a carbon coating thereon. The carbon coating has an oxygen-free structure including pentagon rings. The negative electrode, with the silicon nanoparticles having the carbon coating thereon, may be incorporated into a lithium-based battery. The lithium-based battery also includes a positive electrode and a microporous polymer separator soaked in an electrolyte solution. The microporous polymer separator is disposed between the positive electrode and the negative electrode.

In an example of a method, silicon nanoparticles are provided. A carbon precursor is applied on the silicon nanoparticles. The carbon precursor is an oxygen-free, fluorene-based polymer. Then the silicon nanoparticles are heated in an inert gas atmosphere to form a carbon coating on the silicon nanoparticles. The carbon coating formed on the silicon nanoparticles has an oxygen-free structure including pentagon rings.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
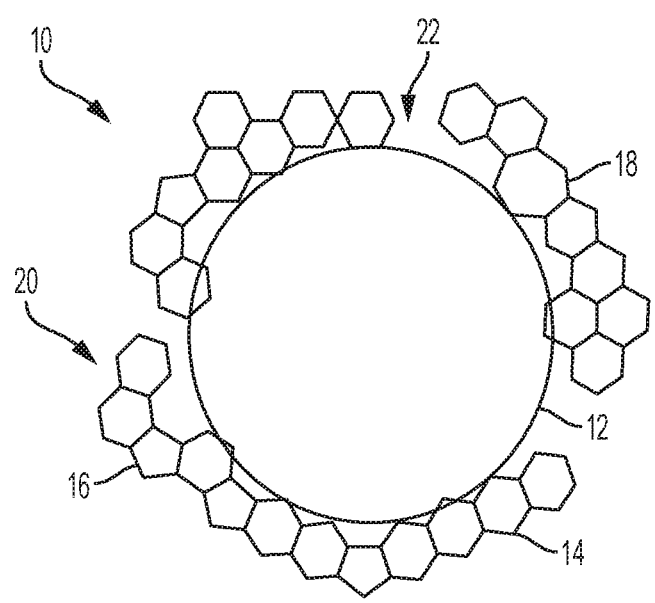
FIG. 1 is a schematic view of an example of a silicon nanoparticle having a carbon coating thereon.

Lithium-based batteries generally operate by reversibly passing lithium ions between a negative electrode (sometimes called an anode) and a positive electrode (sometimes called a cathode). The negative and positive electrodes are situated on opposite sides of a porous polymer separator soaked with an electrolyte solution that is suitable for conducting the lithium ions. During charging, lithium ions are inserted (e.g., intercalated, alloyed, etc.) into the negative electrode, and during discharging, lithium ions are extracted from the negative electrode. Each of the electrodes is also associated with respective current collectors, which are connected by an interruptible external circuit that allows an electric current to pass between the negative and positive electrodes. Examples of lithium-based batteries include a lithium sulfur battery (i.e., includes a sulfur based positive electrode paired with a lithiated negative electrode) and a lithium ion battery (i.e., includes a lithium-based positive electrode paired with a negative electrode or a non-lithium positive electrode paired with a lithiated negative electrode).

Silicon nanoparticles may be used as the active material for a negative electrode. Fully lithiated silicon ($Li_{4.4}Si$) has a high gravimetric capacity of about 2010 mAh and a high volumetric capacity of about 2400 mAh, e.g., as compared to lithiated graphite ($LiC_6$), which has a gravimetric capacity of about 340 mAh and a volumetric capacity of about 712 mAh. However, silicon has a high volume expansion of $V_{Si}:V_{Li4.4Si}=1:4.0$, which means approximately 300% volume expansion (e.g., as compared to silicon suboxide, which may have a volume expansion of $V_{SiOx}:V_{(Li4Si+Li4SiO4)}=1:2.3$, which means approximately 130% volume expansion). The high volume expansion of silicon may result in electrode fracture and loss of electrical contact and electrode integrity. Silicon also has a low electrical conductivity of about $1.5 \times 10^{-3}$ S/m, e.g., as compared to carbon, which may have electrical conductivity greater than $10^3$ S/m. Additionally, a silicon electrode may have a poor cycle life and active surface solid-electrolyte interphase (SEI) formation, which may cause continuous electrolyte consumption and lithium loss.

Silicon nanoparticles may be coated with carbon to mitigate the high volume expansion, low electrical conductivity, poor cycle life, and active surface SEI formation of silicon electrodes. If the carbon coating has oxygen rich surface functional groups, these functional groups may consume active lithium and electrolyte, which may result in low efficiency and cycle life. A carbon coating with oxygen rich surface functional groups may be formed when oxygen rich carbon precursors are used, such as resorcinol-formaldehyde or glucose. Oxygen can be removed from the carbon coating by heating at a high temperature (e.g., greater than 1,000° C.). Additionally, the carbon coating precursors may be heated to increase the electrical conductivity of the carbon coating. However, heating at temperatures higher than about 850° C. may result in the formation of a silicon carbide (SiC) layer between the carbon coating that is formed and the silicon nanoparticles on which the carbon coating is formed. Silicon carbide is an insulator of both electrons and lithium ions, and thus, the formation of a silicon carbide layer may deleteriously affect the electrochemical performance of the carbon coated silicon nanoparticles.

In the negative electrode 24, 24' (see FIGS. 2 and 3) disclosed herein, coated nanoparticles 10 are included as an active material. The coated nanoparticles 10 are made up of silicon nanoparticles 12 having a carbon coating 14 thereon. FIG. 1 schematically illustrates one coated nanoparticle 10, including one silicon nanoparticle 12 with the carbon coating 14 thereon. The carbon coating 14 has an oxygen-free structure including pentagon rings 16.

The method disclosed herein uses an oxygen-free, fluorene-based polymer as a carbon precursor and heats the silicon nanoparticles 12 (with the carbon precursor applied thereon) in an inert gas atmosphere. The method forms the oxygen-free carbon coating 14 on the silicon nanoparticles 12 without having to heat the coating 14 to a temperature greater than 850° C. Thus, a silicon carbide layer is not formed in the coated nanoparticles 10.

Additionally, the oxygen-free, fluorene-based polymer is able to develop electrical conductivity at a relatively low temperature. In an example of the method, the silicon nanoparticles 12, with the carbon precursor applied thereon, are heated at a temperature ranging from about 650° C. to about 750° C.

Further, the oxygen-free, fluorene-based polymer contains pentagon rings, which causes the carbon coating 14 to include pentagon rings 16. The presence of the pentagon rings 16 in the carbon coating 14 may give rise to curvatures 20 in the carbon coating 14, which effectively resist the volume expansion of silicon. In some examples, the oxygen-free, fluorene-based polymer includes an allyl group, which may cross-link the polymer and render a strong electron conducting network throughout the carbon coating 14.

The method for forming the coated nanoparticles 10 includes providing the silicon nanoparticles 12. The silicon nanoparticles 12 provided may have a particle size ranging from about 30 nm to about 100 nm.

The method also includes applying the carbon precursor on the silicon nanoparticles 12. Applying the carbon precursor may be accomplished by mixing the carbon precursor, the silicon nanoparticles 12, and a solvent to form a slurry, and drying the slurry. In an example, the carbon precursor, the silicon nanoparticles 12, and the solvent are mixed by a planetary centrifugal mixer, e.g., a THINKY® Mixer for about 20 minutes. In another example, the slurry is dried in a hood over night (e.g., 12 hours), followed by drying the mixture at 60° C. under vacuum for about 12 hours.

The silicon nanoparticles 12 may be present in the slurry in an amount ranging from about 10 wt % to about 50 wt % (based on the total wt % of the slurry). In an example, the silicon nanoparticles 12 make up about 31.25 wt % of the slurry.

The carbon precursor may be present in the slurry in an amount ranging from about 1 wt % to about 10 wt % (based on the total wt % of the slurry). In an example, the carbon precursor is about 6.25 wt % of the slurry.

In an example, the weight ratio of the carbon precursor to silicon nanoparticles 12 in the slurry is 1:5.

As mentioned above, the carbon precursor is an oxygen-free, fluorene-based polymer. Examples of suitable oxygen-free, fluorene-based polymers include polymers formed (e.g., via a condensation reaction) from the following monomer(s): (i) 9,9-dioctylfluorene-2,7-diboronic acid bis(1,3-propanediol) ester

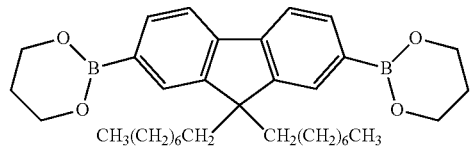

and (ii) 2,7-dibromofluorene

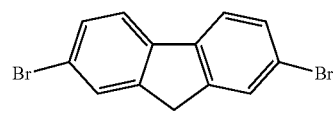 [SMILES: Brc1ccc2c(c1)Cc1cc(Br)ccc1-2]

or a modified 2,7-dibromofluorene monomer (e.g., having an allyl group attached to the 9,9' position). Other examples of monomer (i) include 9,9-Dihexylfluorene-2,7-diboronic acid bis(1,3-propanediol) ester

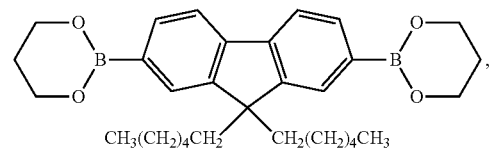

9,9-Didodecylfluorene-2,7-diboronic acid

HO\B—⟨fluorene with R,R⟩—B/OH,
OH           R  R           OH

R = CH$_2$(CH$_2$)$_{10}$CH$_3$ or 9,9-Dihexylfluorene-2,7-diboronic acid

HO\B—⟨fluorene with R,R⟩—B/OH,
HO            R  R            OH

R = CH$_2$(CH$_2$)$_4$CH$_3$ and other examples of monomer (ii) include

H$_3$C   CH$_3$
Br—⟨fluorene⟩—Br, 2,7-Dibromo-9,9-dimethyl-9H-fluorene  2,7-Dibromo-9,9-diallyl-9H-fluorene

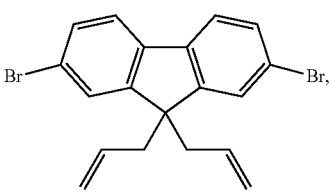 [SMILES: C=CCC1(CC=C)c2cc(Br)ccc2-c2ccc(Br)cc21]

9,9-Didodecyl-2,7-dibromofluorene

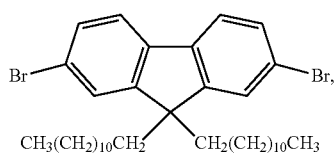

and 9,9-Dihexyl-2,7-dibromofluorene

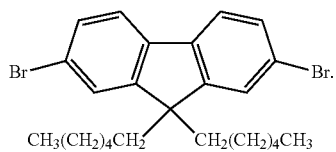

Any of monomer (i) (or another like monomer) may be reacted with any of monomer (ii) to form the oxygen-free, fluorene-based polymers disclosed herein. As another example, 9,9-Didodecylfluorene-2,7-diboronic acid may be reacted with 2,7-Dibromo-9,9-diallyl-9H-fluorene.

While not being bound to any theory, it is believed that use of the oxygen-free, fluorene-based polymer as the carbon precursor allows the structure of the carbon coating 14 to be oxygen-free without being exposed to heating at high temperatures (e.g., greater than 1000° C.). Thus, the use of the oxygen-free, fluorene-based polymer contributes to the ability of the carbon coating 14 to mitigate the high volume expansion, low electrical conductivity, poor cycle life, and active surface SEI formation of silicon electrodes, without consuming active lithium and electrolyte or forming an electrically insulating silicon carbide layer.

As also mentioned above, in some examples, the oxygen-free, fluorene-based polymer includes an allyl group. As an example, the two protons on the five-membered ring structure (9,9' position) of 2,7-dibromofluorene are acidic and can be modified with allyl groups. When they are present, allyl groups in the oxygen-free, fluorene-based polymer may crosslink the polymer. The crosslinked polymer may form a strong electron conducting network in the carbon coating 14. The crosslinked polymer may also be resistant to softening during the heat treatment (which will be discussed below). If the polymer does soften or melt, the carbon coating 14 formed may be insufficiently porous and have a high electrical resistance.

The solvent may be present in the slurry in an amount ranging from about 50 wt % to about 80 wt % (based on the total wt % of the slurry). In an example, the solvent makes up about 62.5 wt % of the slurry. An example of the solvent includes chlorobenzene, dichlorobenzene, etc.

In one specific example, the carbon precursor is applied on the silicon nanoparticles 12 by mixing 1 g of the carbon precursor, 5 g of the silicon nanoparticles 12, and 10 g of chlorobenzene with a THINKY® Mixer to form a slurry. In this example, the slurry may then be dried in a hood.

In some examples, the method may include synthesizing the carbon precursor prior to applying the carbon precursor on the silicon nanoparticles 12. In an example, the carbon precursor may be synthesized by stirring a mixture including fluorene-based monomers (i) and (ii), a catalyst, and a solvent. In an example, the mixture may be stirred in an inert (e.g., argon) gas atmosphere. In another example, the mixture may be vigorously stirred for about 72 hours at 70° C. in tetrahydrofuran (THF).

The fluorene-based monomer(s) may be present in the mixture in an amount ranging from about 2 wt % to about 50 wt % (based on the total wt % of the mixture). In an example, the fluorene-based monomer makes up about 30 wt % of the mixture. As mentioned above, an example of the fluorene-based monomer includes 2,7-dibromofluorene (or a modified version thereof), used in combination with 9,9-dioctylfluorene-2,7-diboronic acid bis(1,3-propanediol) ester at a 1:1 molar ratio. It is to be understood that when an oxygen-containing, fluorene-based monomer is used to synthesize the oxygen-free, fluorene-based polymer, the oxygen will become part of a removable byproduct and will not be present in the synthesized polymer.

While some examples of the fluorene-based monomers are disclosed herein, it is to be understood that any fluorene-based monomers may be used that, when reacted via a condensation reaction, will form an oxygen-free fluorene-based polymer.

The catalyst may be present in the mixture in an amount ranging from about 0.01 wt % to about 1 wt % (based on the total wt % of the mixture). In an example, the catalyst makes up about 0.035 wt % of the mixture. An example of the catalyst includes tetrakis(triphenylphosphine)palladium(0) ((PPh$_3$)$_4$Pd(0)). Other palladium catalysts may also be used.

The solvent may be present in the mixture in an amount ranging from about 30 wt % to about 95 wt % (based on the total wt % of the mixture). In an example, the solvent makes up about 80 wt % of the mixture. Examples of the solvent include tetrahydrofuran (THF), toluene, dimethyl ether (DME), diethyl ether (DEE), and the like.

After the carbon precursor is synthesized, it is to be understood that the mixture has been altered, and at least includes the oxygen-free, fluorene-based polymer, which is the carbon precursor. At least some solvent may also be present in the altered mixture.

After the carbon precursor is synthesized, the carbon precursor may then be removed from the mixture using any suitable separation technique. For example, the carbon precursor may be removed by vacuum filtration, centrifugal force, or any other suitable means. The carbon precursor may be washed multiple times with deionized water during and/or after the separation of the carbon precursor from the altered mixture. It may be desirable to wash the carbon precursor with deionized water before it is applied to the silicon nanoparticles 12.

After the carbon precursor is separated from the altered mixture and washed, the carbon precursor may be dried at a temperature ranging from about 60° C. to about 100° C. for a time period ranging from about 6 hours to about 24 hours. The drying of the precursor may also be under vacuum.

In one specific example, the carbon precursor is synthesized by refluxing, with vigorously stirring, 1.72 g of 9,9-dioctylfluorene-2,7-diboronic acid bis(1,3-propanediol) ester, 1.0 g 2,7-dibromofluorene, 20 mg (PPh$_3$)$_4$Pd(0), 50 g THF, and 5 mL of a 2 M Na$_2$CO$_3$ solution for about 72 hours in an inert gas atmosphere. In this example, the carbon precursor may then be filtered, washed by water, and dried under vacuum at 60° C. overnight (i.e., for 12 hours). The oxygen atoms from 9,9-dioctylfluorene-2,7-diboronic acid bis(1,3-propanediol) ester are present in a byproduct ($Na_2CO_3$—$BO_2C_3H_6$) which is soluble in THF and therefore, removed during filtering.

After the carbon precursor is applied on the silicon nanoparticles 12, the method includes heating the silicon nanoparticles 12 (with the carbon precursor thereon) to form the carbon coating 14 on the silicon nanoparticles 12. In addition to forming the carbon coating 14, the heating also causes the carbon coating 14 to develop electrical conductivity. In an example, the silicon nanoparticles 12 (with the carbon precursor thereon) are heated at a temperature ranging from about 650° C. to about 750° C. for a time period ranging from about 1 hour to about 10 hours. In another example, the silicon nanoparticles 12 (with the carbon precursor thereon) are heated at a temperature of 720° C. for a time period ranging from about 1 hour to about 10 hours.

The heating of the silicon nanoparticles 12 may be performed in an inert gas atmosphere. In some examples of the method, the silicon nanoparticles 12 may be purged with an inert gas prior to being heated to form the carbon coating 14. In one such example, the silicon nanoparticles 12 with the carbon precursor applied thereon may be purged with argon gas after being placed in a closed system (e.g., a furnace) and prior to being heated. While not being bound to any theory, it is believed that heating in an inert gas atmosphere and/or purging the silicon nanoparticles 12 with an inert gas may help the structure of the carbon coating 14 to remain oxygen-free at a heating temperature ranging from about 650° C. to about 750° C. The oxygen-free structure of the carbon coating 14 allows the carbon coating 14 to mitigate the high volume expansion, low electrical conductivity, poor cycle life, and active surface SEI formation of silicon electrodes, without consuming active lithium and electrolyte or forming an electrically insulating silicon carbide layer.

As shown in FIG. 1, the structure of the carbon coating 14, in addition to being oxygen-free, includes pentagon rings 16. In some examples, the structure of the carbon coating 14 further includes heptagon rings 18. The presence of the pentagon rings 16 and/or the heptagon rings 18 in the structure of the carbon coating 14 may give rise to curvatures 20 in the carbon coating 14. While not being bound to any theory, it is believed that the presence of these curvatures 20 in the carbon coating 14 may help the coating 14 resist the volume expansion of silicon.

As shown in FIG. 1, the carbon coating 14 may have pores 22. When the silicon nanoparticles 12 are heated to form the carbon coating 14, the carbon precursor may release small molecule gases (e.g., hydrogen gas, water vapor, and carbon dioxide). These small molecule gases form pores 22 in the carbon coating 14. When the carbon coated silicon nanoparticles 10 are incorporated into the negative electrode 24, 24' (see FIGS. 2 and 3) of a battery, the electrolyte may fill the pores 22 and allow lithium ions to be conducted to and from the silicon nanoparticles 12.

As mentioned above, the presence of allyl groups in the oxygen-free, fluorene-based polymer may affect the porosity of the carbon coating 14. Allyl groups may promote the crosslinking of the oxygen-free, fluorene-based polymer, and crosslinking may prevent the polymer from softening or melting during the heating of the silicon nanoparticles 12. Polymer melting or softening may cause the carbon coating 14 to be insufficiently porous. If the carbon coating 14 is insufficiently porous, too few lithium ions will be conducted to and from the silicon nanoparticles 12.

The pores 22 of the carbon coating 14 may be any shape (e.g., circular, elongated, or irregularly shaped). The pores 22 of the carbon coating 14 may also be any size. In an example, 80% of the pores 22 in the carbon coating 14 are meso-sized (i.e., from about 2 nm to about 50 nm in diameter). In another example, the average diameter of the pores 22 ranges from 2 nm to 50 nm. In still another example, the pore volume may range from about 0.1 $cm^3$/g to about 0.5 $cm^3$/g.

The carbon coating 14 may also have a surface area ranging from about 50 $m^2$/g to about 300 $m^2$/g. If the surface area of the carbon coating 14 is too high (e.g., greater than 1,000 $m^2$/g), a large amount of active lithium may be consumed to form SEI. The surface area of the carbon coating 14 may be affected by the number of pores 22 in the coating 14, the size of the pores 22 in the coating 14, and the thickness of the coating 14. In an example, the carbon coating 14 may have a thickness ranging from about 1 nm to about 10 nm.

Figure 2:
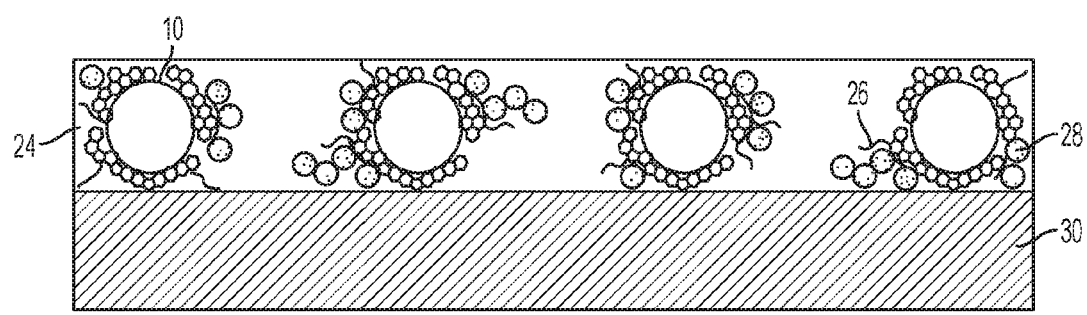
FIG. 2 is a schematic, cross-sectional view of an example of a negative electrode, including an example of the carbon coated silicon nanoparticles disclosed herein, on a current collector.
Figure 3:
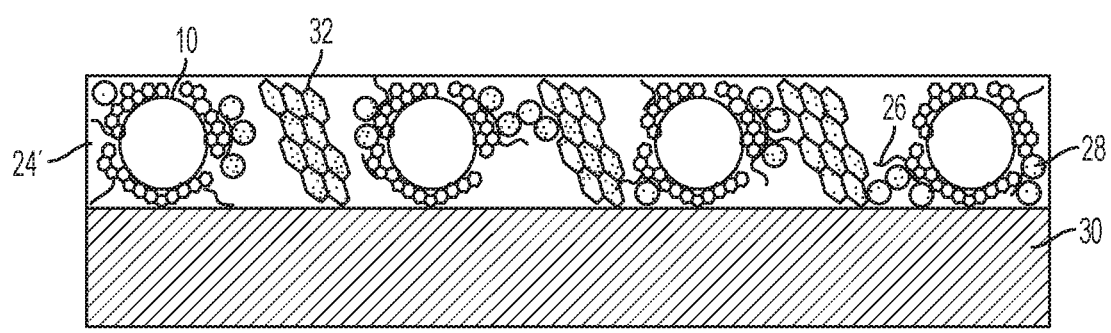
FIG. 3 is a schematic, cross-sectional view of another example of a negative electrode, including an example of the carbon coated silicon nanoparticles disclosed herein, on a current collector.

After obtaining the coated nanoparticles 10 (i.e., silicon nanoparticles 12 having the carbon coating 14 thereon), the carbon coated silicon nanoparticle 10 may be added, as an active material, to a negative electrode composition to form a negative electrode 24, 24' for use in a lithium-based battery. An example of the method for preparing a negative electrode 24, 24' of a lithium-based battery 400, 500 (see FIGS. 4 and 5) will now be discussed in reference to FIGS. 2 and 3. FIG. 2 depicts an example of a negative electrode 24 including the carbon coated silicon nanoparticles 10 as an active material, a binder 26, and a conductive filler 28, on a support 30. FIG. 3 depicts an example of a negative electrode 24' including the carbon coated silicon nanoparticles 10 as an active material, a binder 26, a conductive filler 28, and an additional active material 32, on a support 30.

In examples of preparing the negative electrode 24, the carbon coated silicon nanoparticles 10 are dry mixed with the conductive filler 28. In examples of preparing the negative electrode 24', the carbon coated silicon nanoparticles 10 are dry mixed with the additional active material 32 and the conductive filler 28. In some instances, the binder 26 is also dry mixed with the other components 10, 28 or 10, 28, 32. A solvent may then be added to the dry mixture. In other instances, the binder 26 and solvent are mixed together, and then added to the dry mixed components 10, 28 or 10, 28, 32. As will be discussed in more detail below, the solvent may be deionized water or an organic solvent, depending on the binder 26 selected to form a dispersion or mixture.

The additional active material 32, included in the negative electrode 24', may be any lithium host active material that may be incorporated into the negative electrode 24' using a slurry coating method and that can sufficiently undergo lithium intercalation and deintercalation, or lithium alloying and dealloying, or lithium insertion and deinsertion, while copper or another current collector 30 functions as the negative terminal of the electrochemical cell/battery. Examples of the lithium host active material include graphite or silicon-based materials. Further examples include tin, alloys of tin, antimony, and alloys of antimony. Graphite exhibits favorable lithium intercalation and deintercalation characteristics, is relatively non-reactive, and can store lithium in quantities that produce a relatively high energy density. Commercial forms of graphite that may be used to fabricate the additional active material 32 of the negative electrode 24' are available from, for example, Timcal Graphite & Carbon (Bodio, Switzerland), Lonza Group (Basel, Switzerland), or Superior Graphite (Chicago, Ill.). Examples of the silicon-based active material include crystalline silicon, amorphous silicon, silicon oxide ($SiO_x$), silicon alloys (e.g., Si—Sn), etc. The silicon active material may be in the form of a powder, particles, etc. ranging from nano-size to micro-size.

The carbon coated silicon nanoparticles 10, alone or in combination with the additional active material 32 may be intermingled with the binder 26 and the conductive filler 28. The binder 26 may be used to structurally hold the carbon coated silicon nanoparticles 10, the conductive filler 28, and/or the additional active material 32 together. Some examples of suitable binders 26 include polyvinylidene fluoride (PVdF), polyethylene oxide (PEO), an ethylene propylene diene monomer (EPDM) rubber, carboxymethyl cellulose (CMC), styrene-butadiene rubber (SBR), styrene-butadiene rubber carboxymethyl cellulose (SBR-CMC), polyacrylic acid (PAA), cross-linked polyacrylic acid-polyethylenimine, polyimide, or any other suitable binder material. Examples of the still other suitable binders 26 include polyvinyl alcohol (PVA), sodium alginate, or other water-soluble binders.

The conductive filler 28 may be a conductive carbon material. The conductive carbon may be a high surface area carbon, such as acetylene black or another carbon material (e.g., Super P). Other examples of suitable conductive fillers 28 include graphene, graphite, carbon nanotubes, and/or carbon nanofibers. The conductive filler 28 ensures electron conduction between the negative-side current collector 30 and the carbon coated silicon nanoparticles 10 and/or the additional active material 32.

In an example of the method for making the negative electrode 24, the carbon coated silicon nanoparticles 10 are mixed with the binder 26 and the conductive filler 28. In an example of the method for making the negative electrode 24', the carbon coated silicon nanoparticles 10 are mixed with the binder 26, the conductive filler 28, and the additional active material 32. In either of these examples, all of the components may be manually mixed by dry-grinding. After all the components are ground together, the ground components are combined with water or organic solvent (depending on the binder 26 used) to form the dispersion/mixture. In an example, the solvent is a polar aprotic solvent. Examples of suitable polar aprotic solvents include dimethylacetamide (DMAc), N-methyl-2-pyrrolidone (NMP), dimethylformamide (DMF), dimethylsulfoxide (DMSO), or another Lewis base, or combinations thereof. When a water soluble binder, such as sodium alginate, is used, the solvent may be water.

The dispersion/mixture may be mixed by milling. Milling aids in transforming the dispersion/mixture into a coatable slurry. Low-shear milling or high-shear milling may be used to mix the dispersion/mixture. The dispersion/mixture milling time ranges from about 10 minutes to about 20 hours depending on the milling shear rate. In an example, a rotator mixer is used for about 20 minutes at about 2000 rpm to mill the dispersion/mixture.

The carbon coated silicon nanoparticles 10 may be present in the dispersion/mixture in an amount ranging from about 5 wt % to about 95 wt % (based on total solid wt % of the dispersion/mixture). When the additional active material 32 is not present in the dispersion/mixture, the carbon coated silicon nanoparticles 10 may be present in a greater amount (e.g., an amount ranging from about 50 wt % to about 95 wt %) as the coated nanoparticles function as the sole active material. When the additional active material 32 is present in the dispersion/mixture, the carbon coated silicon nanoparticles 10 may be present in a lesser amount (e.g., an amount ranging from about 5 wt % to about 45 wt %). When it is present in the dispersion/mixture, the additional active material 32 may be present in an amount ranging from about 50 wt % to about 95 wt % (based on total solid wt % of the dispersion/mixture). The binder 26 may be present in the dispersion/mixture in an amount ranging from about 1 wt % to about 20 wt % (based on total solid wt % of the dispersion/mixture), and the conductive filler 28 may be present in the dispersion/mixture in an amount ranging from about 1 wt % to about 20 wt % (based on total solid wt % of the dispersion/mixture).

The slurry is then deposited onto the support 30. In an example, the support 30 is the negative-side current collector. In another example, the support 30 is a foil support. It is to be understood that the support 30 may be formed from copper, nickel, or any other appropriate electrically conductive material known to skilled artisans. The support 30 that is selected should be capable of collecting and moving free electrons to and from an external circuit connected thereto.

The slurry may be deposited using any suitable technique. As examples, the slurry may be cast on the surface of the support 30, or may be spread on the surface of the support 30, or may be coated on the surface of the support 30 using a slot die coater.

The deposited slurry may be exposed to a drying process in order to remove any remaining solvent and/or water. Drying may be accomplished using any suitable technique. For example, the drying is conducted at ambient conditions (i.e., at room temperature, about 18° C. to 22° C., and 1 atmosphere). Drying may be performed at an elevated temperature ranging from about 60° C. to about 150° C. In some examples, vacuum may also be used to accelerate the drying process. As one example of the drying process, the deposited slurry may be exposed to vacuum at about 100° C. for about 12 to 24 hours.

The drying process results in the formation of the negative electrode 24, 24'. In an example, the thickness of the dried slurry (i.e., negative electrode 24, 24') ranges from about 5 µm to about 200 µm. In another example, the thickness of the dried slurry (i.e., negative electrode 24, 24') ranges from about 10 µm to about 100 µm.

During the formation of the negative electrode 24, 24', the water and/or organic solvent(s) is/are removed, and thus the resulting negative electrode 24, 24' may include the carbon coated silicon nanoparticles 10, the binder 26, the conductive filler 28, and/or the additional active material 32 in the following amounts. The carbon coated silicon nanoparticles 10 may be present in the negative electrode 24, 24' in an amount ranging from about 5 wt % to about 95 wt % (based on the total wt % of the negative electrode 24, 24'). When the additional active material 32 is not present in the negative electrode 24, the carbon coated silicon nanoparticles 10 may be present in a greater amount (e.g., an amount ranging from about 50 wt % to about 95 wt %), and when the additional active material 32 is present in the negative electrode 24', the carbon coated silicon nanoparticles 10 may be present in a lesser amount (e.g., an amount ranging from about 5 wt % to about 45 wt %). When it is present in the negative electrode 24', the additional active material 32 may be present in an amount ranging from about 50 wt % to about 95 wt % (based on the total wt % of the negative electrode 24'). The binder 26 may be present in the negative electrode 24, 24' in an amount ranging from about 1 wt % to about 20 wt % (based on the total wt % of the negative electrode 24, 24'), and the conductive filler 28 may be present in the negative electrode 24, 24' in an amount ranging from about 1 wt % to about 20 wt % (based on the total wt % of the negative electrode 24, 24').

If the negative electrode 24, 24' is to be paired with a positive electrode that is not formed of lithium, the negative electrode 24, 24' may be exposed to a pre-lithiation process prior to incorporating it into the electrochemical cell/battery. The pre-lithiation technique lithiates the negative electrode 24, 24'. In an example, the negative electrode 24, 24' may then be pre-lithiated by applying lithium powder (such as stabilized lithium metal powder (SLMP) from FMC Company) or lithium foil onto the electrode, followed by calendaring the electrode/Lithium powder (or foil).

The pre-lithiated negative electrode 24, 24' may then be used in an electrochemical cell/battery. In general, the cell/battery may be assembled with the negative electrode 24, 24', a suitable positive electrode (examples of which will be described below), a microporous polymer separator positioned between the negative and positive electrodes, and an example of the electrolyte disclosed herein including a suitable solvent for the particular battery type.

Sulfur Battery/Electrochemical Cell

Figure 4:
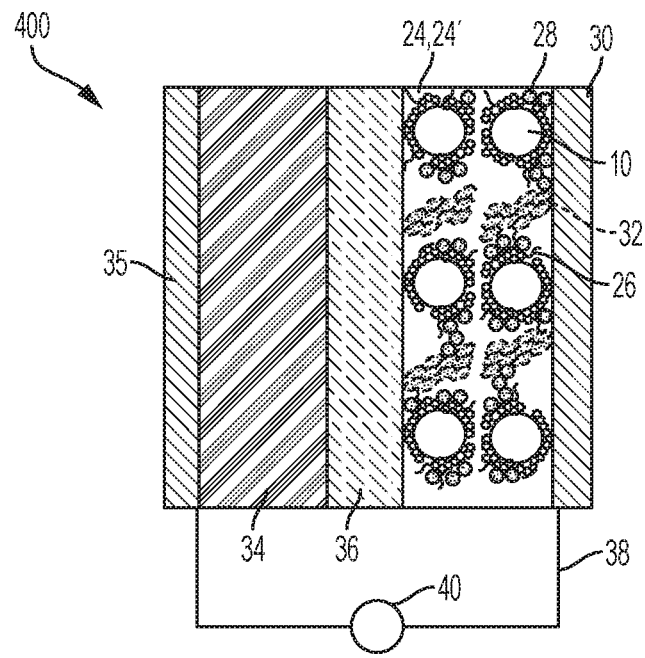
FIG. 4 is a schematic, cross-sectional view of an example of a lithium sulfur battery that has a negative electrode including an example of the carbon coated silicon nanoparticles disclosed herein.

An example of a sulfur battery 400 is shown in FIG. 4. For the sulfur battery/electrochemical cell 400, any example of the negative electrode 24, 24' (e.g., with or without the additional active material 32) may be used.

The positive electrode 34 of the sulfur battery 400 may include any sulfur-based active material that can sufficiently undergo lithium alloying and dealloying with aluminum or another suitable current collector 35 functioning as the positive terminal of the sulfur electrochemical cell. An example of the sulfur-based active material is a sulfur-carbon composite. In an example, the weight ratio of S to C in the positive electrode 34 ranges from 1:9 to 9:1. The positive electrode 34 in the sulfur battery 400 may include any of the previously mentioned binders 26 and conductive fillers 28.

The microporous polymer separator 36 may be formed, e.g., from a polyolefin. The polyolefin may be a homopolymer (derived from a single monomer constituent) or a heteropolymer (derived from more than one monomer constituent), and may be either linear or branched. If a heteropolymer derived from two monomer constituents is employed, the polyolefin may assume any copolymer chain arrangement including those of a block copolymer or a random copolymer. The same holds true if the polyolefin is a heteropolymer derived from more than two monomer constituents. As examples, the polyolefin may be polyethylene (PE), polypropylene (PP), a blend of PE and PP, or multi-layered structured porous films of PE and/or PP. Commercially available porous separators 36 include single layer polypropylene membranes, such as CELGARD 2400 and CELGARD 2500 from Celgard, LLC (Charlotte, N.C.). It is to be understood that the microporous separator 36 may be coated or treated, or uncoated or untreated. For example, the microporous separator 36 may or may not be coated or include any surfactant treatment thereon.

In other examples, the microporous separator 36 may be formed from another polymer chosen from polyethylene terephthalate (PET), polyvinylidene fluoride (PVdF), polyamides (Nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polyolefin copolymers, acrylonitrile-butadiene styrene copolymers (ABS), polystyrene copolymers, polymethylmethacrylate (PMMA), polyvinyl chloride (PVC), polysiloxane polymers (such as polydimethylsiloxane (PDMS)), polybenzimidazole (PBI), polybenzoxazole (PBO), polyphenylenes (e.g., PARMAX (Mississippi Polymer Technologies, Inc., Bay Saint Louis, Miss.)), polyarylene ether ketones, polyperfluorocyclobutanes, polytetrafluoroethylene (PTFE), polyvinylidene fluoride copolymers and terpolymers, polyvinylidene chloride, polyvinylfluoride, liquid crystalline polymers (e.g., VECTRAN (Hoechst AG, Germany) and ZENITE® (DuPont, Wilmington, Del.)), polyaramides, polyphenylene oxide, and/or combinations thereof. It is believed that another example of a liquid crystalline polymer that may be used for the microporous separator 36 is poly(p-hydroxybenzoic acid). In yet another example, the microporous separator 36 may be chosen from a combination of the polyolefin (such as PE and/or PP) and one or more of the other polymers listed above.

The microporous separator 36 may be a single layer or may be a multi-layer (e.g., bilayer, trilayer, etc.) laminate fabricated from either a dry or wet process. For example, a single layer of the polyolefin and/or other listed polymer may constitute the entirety of the microporous polymer separator 36. As another example, however, multiple discrete layers of similar or dissimilar polyolefins and/or polymers may be assembled into the microporous polymer separator 36. In one example, a discrete layer of one or more of the polymers may be coated on a discrete layer of the polyolefin to form the microporous polymer separator 36. Further, the polyolefin (and/or other polymer) layer, and any other optional polymer layers, may further be included in the microporous polymer separator 36 as a fibrous layer to help provide the microporous polymer separator 36 with appropriate structural and porosity characteristics. Still other suitable microporous polymer separators 36 include those that have a ceramic layer attached thereto, and those that have ceramic filler in the polymer matrix (i.e., an organic-inorganic composite matrix).

The microporous separator 36 operates as both an electrical insulator and a mechanical support, and is sandwiched between the negative electrode 24, 24' and the positive electrode 34 to prevent physical contact between the two electrodes 24, 34 or 24', 34 and the occurrence of a short circuit. In addition to providing a physical barrier between the electrodes 24, 34 or 24', 34, the microporous polymer separator 36 ensures passage of lithium ions through the electrolyte filling its pores.

The pre-lithiated negative electrode 24, 24' (e.g., including Si, $SiO_x$, graphite, Sn or combinations thereof), the sulfur based positive electrode 34, and the microporous separator 36 are soaked with the electrolyte (not shown), including a solvent suitable for the sulfur battery 400 and a lithium salt.

In an example, the solvent suitable for the lithium sulfur battery 400 may be an ether based solvent. Examples of the ether based solvent include cyclic ethers, such as 1,3-dioxolane, tetrahydrofuran, 2-methyltetrahydrofuran, and chain structure ethers, such as 1,2-dimethoxyethane, 1-2-diethoxyethane, ethoxymethoxyethane, tetraethylene glycol dimethyl ether (TEGDME), polyethylene glycol dimethyl ether (PEGDME), ethyl ether, aliphatic ethers, polyethers, and mixtures thereof.

Examples of the lithium salt that may be dissolved in the ether(s) include $LiPF_6$, $LiClO_4$, $LiAlCl_4$, LiI, LiBr, LiSCN, $LiBF_4$, $LiB(C_6H_5)_4$, $LiAsF_6$, $LiCF_3SO_3$, $LiN(FSO_2)_2$ (LIFSI), $LiN(CF_3SO_2)_2$ (LITFSI or lithium bis(trifluoromethylsulfonyl)imide), $LiB(C_2O_4)_2$ (LiBOB), $LiBF_2(C_2O_4)$ (LiODFB), $LiPF_3(C_2F_5)_3$ (LiFAP), $LiPF_4(CF_3)_2$, $LiPF_4(C_2O_4)$ (LiFOP), $LiPF_3(CF_3)_3$, $LiSO_3CF_3$, $LiNO_3$, and mixtures thereof.

Lithium Ion Battery/Electrochemical Cell

Figure 5:
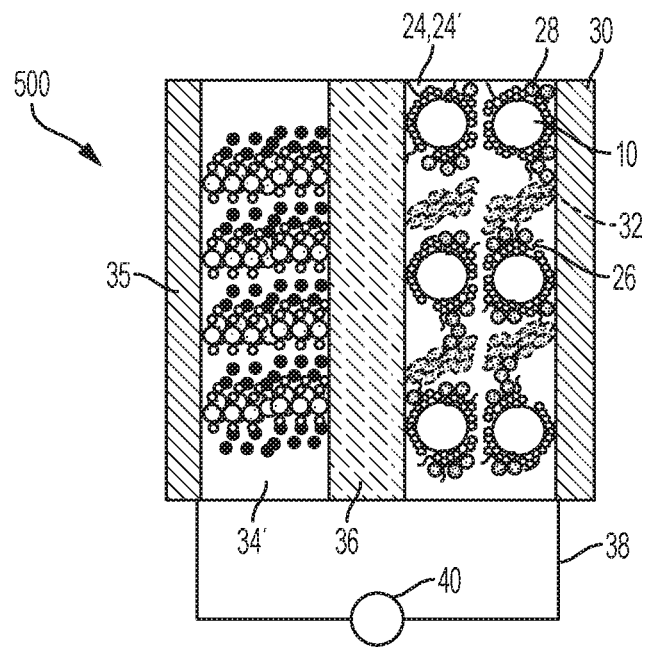
FIG. 5 is a cross-sectional, schematic view of an example of a lithium ion battery that has a negative electrode including an example of the carbon coated silicon nanoparticles disclosed herein.

An example of a lithium ion battery 500 is shown in FIG. 5. For the lithium ion battery/electrochemical cell 500, any example of the negative electrode 24, 24' (e.g., with or without the additional active material 32) may be used.

The positive electrode 34' of the lithium ion battery 500 may include any lithium-based or non-lithium-based active material that can sufficiently undergo lithium insertion and deinsertion with aluminum or another suitable current collector 35 functioning as the positive terminal of the lithium ion electrochemical cell.

One common class of known lithium-based active materials suitable for this example of the positive electrode 34' includes layered lithium transition metal oxides. For example, the lithium-based active material may be spinel lithium manganese oxide ($LiMn_2O_4$), lithium cobalt oxide ($LiCoO_2$), a manganese-nickel oxide spinel [$Li(Mn_{1.5}Ni_{0.5})O_2$], or a layered nickel-manganese-cobalt oxide (having a general formula of $xLi_2MnO_3 \cdot (1-x)LiMO_2$ or (M is composed of any ratio of Ni, Mn and/or Co). A specific example of the layered nickel-manganese-cobalt oxide includes ($xLi_2MnO_3 \cdot (1-x)Li(Ni_{1/3}Mn_{1/3}Co_{1/3})O_2$). Other suitable lithium-based active materials include $Li(Ni_{1/3}Mn_{1/3}CO_{1/3})O_2$ $Li_{x+y}Mn_{2-y}O_4$ (LMO, $0<x<1$ and $0<y<0.1$), or a lithium iron polyanion oxide, such as lithium iron phosphate ($LiFePO_4$) or lithium iron fluorophosphate ($Li_2FePO_4F$), or a lithium rich layer-structure. Still other lithium-based active materials may also be utilized, such as $LiNi_{1-x}Co_{1-y}M_{x+y}O_2$ or $LiMn_{1.5-x}Ni_{0.5-y}M_{x+y}O_4$ (M is composed of any ratio of Al, Ti, Cr, and/or Mg), stabilized lithium manganese oxide spinel ($Li_xMn_{2-y}M_yO_4$, where M is composed of any ratio of Al, Ti, Cr, and/or Mg), lithium nickel cobalt aluminum oxide (e.g., $LiNi_{0.8}Co_{0.15}Al_{0.05}O_2$) or NCA), aluminum stabilized lithium manganese oxide spinel (e.g., $Li_xAl_{0.05}Mn_{0.95}O_2$), lithium vanadium oxide ($LiV_2O_5$), $Li_2MSiO_4$ (where M is composed of any ratio of Co, Fe, and/or Mn), and any other high energy nickel-manganese-cobalt material (HE-NMC, NMC or $LiNiMnCoO_2$). By "any ratio" it is meant that any element may be present in any amount. So, in some examples, M could be Al, with or without Cr, Ti, and/or Mg, or any other combination of the listed elements. In another example, anion substitutions may be made in the lattice of any example of the lithium transition metal based active material to stabilize the crystal structure. For example, any 0 atom may be substituted with an F atom.

Suitable non-lithium based materials for this example of the positive electrode 34' include metal oxides, such as manganese oxide ($Mn_2O_4$), cobalt oxide ($CoO_2$), a nickel-manganese oxide spinel, a layered nickel-manganese-cobalt oxide, or an iron polyanion oxide, such as iron phosphate ($FePO_4$) or iron fluorophosphate ($FePO_4F$), or vanadium oxide ($V_2O_5$).

The positive electrode 34' in the lithium ion electrochemical cell/battery 500 may include any of the previously mentioned binders 26 and conductive fillers 28.

The lithium ion electrochemical cell/battery 500 may also include any of the previously provided examples of the microporous polymer separator 36.

The negative electrode 24, 24', the positive electrode 34', and the microporous separator 36 are soaked with the electrolyte (not shown), including a solvent suitable for the lithium ion battery 500 and a lithium salt.

In an example, the solvent suitable for the lithium ion battery 500 may be an organic solvent or a mixture of organic solvents. Examples of suitable organic solvents include cyclic carbonates (ethylene carbonate, propylene carbonate, butylene carbonate, fluoroethylene carbonate), linear carbonates (dimethyl carbonate (DMC), diethyl carbonate, ethylmethyl carbonate), aliphatic carboxylic esters (methyl formate, methyl acetate, methyl propionate), γ-lactones (γ-butyrolactone, γ-valerolactone), chain structure ethers (1,2-dimethoxyethane, 1-2-diethoxyethane, ethoxymethoxyethane, tetraglyme), cyclic ethers (tetrahydrofuran, 2-methyltetrahydrofuran, 1,3-dioxolane), dioxane, acetonitrile, nitromethane, ethyl monoglyme, phosphoric triesters, trimethoxymethane, dioxolane derivatives, 3-methyl-2-oxazolidinone, propylene carbonate derivatives, tetrahydrofuran derivatives, ethyl ether, 1,3-propanesultone, N-methyl acetamide, acetals, ketals, sulfones, sulfolanes, aliphatic ethers, cyclic ethers, glymes, polyethers, phosphate esters, siloxanes, dioxolanes, N-alkylpyrrolidones, and mixtures thereof.

Examples of the lithium salt that may be dissolved in the organic solvent(s) include all of the lithium salts listed above that may be dissolved in the ether(s).

As shown in FIGS. 4 and 5, the lithium sulfur battery/electrochemical cell 400 and lithium ion battery/electrochemical cell 500 each may include an interruptible external circuit 38 that connects the negative electrode 24, 24' and the positive electrode 34, 34'. The lithium sulfur battery/electrochemical cell 400 and lithium ion battery/electrochemical cell 500 each may also also support a load device 40 that can be operatively connected to the external circuit 38. The load device 40 receives a feed of electrical energy from the electric current passing through the external circuit 38 when the battery 400, 500 is discharging. While the load device 40 may be any number of known electrically-powered devices, a few specific examples of a power-consuming load device 40 include an electric motor for a hybrid vehicle or an all-electrical vehicle, a laptop computer, a cellular phone, and a cordless power tool. The load device 40 may also, however, be an electrical power-generating apparatus that charges the battery 400, 500 for purposes of storing energy. For instance, the tendency of windmills and solar panels to variably and/or intermittently generate electricity often results in a need to store surplus energy for later use.

FIGS. 4 and 5 also illustrate the porous separator 36 positioned between the electrodes 24, 24', 34, 34'. Metal contacts/supports (e.g., a copper foil contact/support or a nickel foil contact/support) may be made to the electrodes 24, 24', 34, 34', examples of which include a negative-side current collector 30 to the negative electrode 24, 24', and a positive-side current collector 35 to the positive electrode 34, 34'.

The lithium sulfur battery/electrochemical cell 400 and/or lithium ion battery/electrochemical cell 500 may also include a wide range of other components that, while not depicted here, are nonetheless known to skilled artisans. For instance, the battery 400, 500 may include a casing, gaskets, terminals, tabs, and any other desirable components or materials that may be situated between or around the negative electrode 24, 24' and the positive electrode 34, 34' for performance-related or other practical purposes. Moreover, the size and shape of the battery 400, 500, as well as the design and chemical make-up of its main components, may vary depending on the particular application for which it is designed. Battery-powered automobiles and hand-held consumer electronic devices, for example, are two instances where the battery 400, 500 would most likely be designed to different size, capacity, and power-output specifications. The battery 400, 500 may also be connected in series and/or in parallel with other similar batteries to produce a greater voltage output and current (if arranged in parallel) or voltage (if arranged in series) if the load device 40 so requires.

The lithium sulfur battery/electrochemical cell 400 and lithium ion battery/electrochemical cell 500 each generally operates by reversibly passing lithium ions between the negative electrode 24, 24' and the positive electrode 34, 34'. In the fully charged state, the voltage of the battery 400, 500 is at a maximum (typically in the range 2.0V to 5.0V); while in the fully discharged state, the voltage of the battery 400, 500 is at a minimum (typically in the range 0V to 2.0V). Essentially, the Fermi energy levels of the active materials in the positive and negative electrodes 34, 34', 24, 24' change during battery operation, and so does the difference between the two, known as the battery voltage. The battery voltage decreases during discharge, with the Fermi levels getting closer to each other. During charge, the reverse process is occurring, with the battery voltage increasing as the Fermi levels are being driven apart. During battery discharge, the external load device 40 enables an electronic current flow in the external circuit 38 with a direction such that the difference between the Fermi levels (and, correspondingly, the cell voltage) decreases. The reverse happens during battery charging: the battery charger forces an electronic current flow in the external circuit 38 with a direction such that the difference between the Fermi levels (and, correspondingly, the cell voltage) increases.

At the beginning of a discharge, the negative electrode 24, 24' of the battery 400, 500 contains a high concentration of inserted (e.g., alloyed, intercalated, etc.) lithium while the positive electrode 34, 34' is relatively depleted. When the negative electrode 24, 24' contains a sufficiently higher relative quantity of inserted lithium, the lithium-based battery 400, 500 can generate a beneficial electric current by way of reversible electrochemical reactions that occur when the external circuit 38 is closed to connect the negative electrode 24, 24' and the positive electrode 34, 34'. The establishment of the closed external circuit 38 under such circumstances causes the extraction of inserted lithium from the negative electrode 24, 24'. The extracted lithium atoms are split into lithium ions and electrons as they leave a host (i.e., the active material(s)) at the negative electrode-electrolyte interface.

The chemical potential difference between the positive electrode 34, 34' and the negative electrode 24, 24' (ranging from about 0.005V to about 5.0V, depending on the exact chemical make-up of the electrodes 24, 24', 34, 34') drives the electrons produced by the oxidation of inserted lithium at the negative electrode 24, 24' through the external circuit 38 towards the positive electrode 34, 34'. The lithium ions are concurrently carried by the electrolyte solution through the microporous separator 36 towards the positive electrode 34, 34'. The electrons flowing through the external circuit 38 and the lithium ions migrating across the microporous separator 36 in the electrolyte solution eventually incorporate, in some form, lithium at the positive electrode 34, 34'. The electric current passing through the external circuit 38 can be harnessed and directed through the load device 40 until the level of inserted lithium in the negative electrode 24, 24' falls below a workable level or the need for electrical energy ceases.

The battery 400, 500 may be recharged after a partial or full discharge of its available capacity. To charge the battery 400, 500 an external battery charger is connected to the positive and the negative electrodes 24, 24', 34, 34' to drive the reverse of battery discharge electrochemical reactions. During recharging, the electrons flow back towards the negative electrode 24, 24' through the external circuit 38, and the lithium ions are carried by the electrolyte across the microporous separator 36 back towards the negative electrode 24, 24'. The electrons and the lithium ions are reunited at the negative electrode 24, 24', thus replenishing it with inserted lithium for consumption during the next battery discharge cycle.

The external battery charger that may be used to charge the battery 400, 500 may vary depending on the size, construction, and particular end-use of the battery 400, 500. Some suitable external battery chargers include a battery charger plugged into an AC wall outlet and a motor vehicle alternator.

The battery 400, 500 including the negative electrode 24, 24', which includes the carbon coated silicon nanoparticles 10, may have a first cycle efficiency greater than about 70%. The battery 400, 500 may also have a stable cycling performance for many cycles. In one example, the battery 400, 500 has a loading of the carbon coated silicon nanoparticles 10 of about 1.5 mg/cm$^2$, and a stable cycling performance for about 300 cycles. In another example, the battery 400, 500 has a loading of the carbon coated silicon nanoparticles 10 of about 0.5 mg/cm$^2$, and a stable cycling performance for about 1,000 cycles.

To further illustrate the present disclosure, an example is given herein. It is to be understood that this example is provided for illustrative purposes and is not to be construed as limiting the scope of the disclosure.

EXAMPLE

Two example negative electrodes and two comparative negative electrodes were prepared. Example carbon coated silicon nanoparticles were prepared according to an example of the method disclosed herein, and were used as the active material in the example negative electrode. Comparative carbon coated silicon nanoparticles were purchased and were used as the active material in the comparative negative electrodes.

The oxygen-free, fluorene-base polymer was used as the carbon precursor to form the example carbon coated silicon nanoparticles. The oxygen-free, fluorene-base polymer was synthesized by vigorously stirring 1.72 g of 9,9-dioctylfluorene-2,7-diboronic acid bis(1,3-propanediol) ester, 1.0 g 2,7-dibromofluorene, 20 mg tetrakis(triphenylphosphine) palladium(0), 50 g tetrahydrofuran, and 5 mL of a 2 M sodium carbonate solution for about 72 hours in an argon gas atmosphere. Then, the synthesized polymer was filtered, washed with water, and dried overnight (i.e., for 12 hours) under vacuum at 60° C.

Then, 1 g of the synthesized polymer and 5 g of silicon nanoparticles were mixed in 10 g of chlorobenzene by a THINKY® Mixer to form a slurry. The slurry was then dried in a hood.

The dried mixture was then transferred to a furnace and purged with argon gas. The purged mixture was heated by the furnace to 720° C. at a rate of 10° C./minute and was held at 720° C. for 2 hours to form the carbon coated silicon nanoparticles. After cool down, the mixture was pestle pressed to make fine powders.

The carbon coating of the comparative carbon coated silicon nanoparticles had been formed from a resorcinal-formaldehyde (RF) polymer, which includes oxygen.

The example carbon coated silicon nanoparticles were incorporated as an active martial in example negative electrodes. The comparative, RF carbon coated silicon nanoparticles were incorporated as active materials in comparative negative electrodes. An additional active material was not used in the example negative electrodes or in the comparative negative electrodes. Each of the example negative electrodes included about 70 wt % of the example carbon coated silicon nanoparticles, about 15 wt % of a binder (sodium alginate), and about 15 wt % of a conductive filler (carbon black). Each of the comparative negative electrodes included all of the same components as the example negative electrode except for the type of carbon coated silicon nanoparticles. As mentioned above, the comparative negative electrodes included carbon coated silicon nanoparticles formed using a resorcinal-formaldehyde polymer as the carbon precursor.

To form each of the example and comparative negative electrodes, the respective carbon coated silicon nanoparticles and the carbon black were dry mixed in a THINKY® mixer. The sodium alginate, carbon black and a solvent (water) were added to each of the dry mixtures. The mixtures were mixed until relatively uniform, coatable slurries were formed. The slurries were casted onto respective copper current collectors. The example electrode coating and comparative electrode coating were dried at room temperature in air, then dried in an oven at about 80° C. for about 24 hours, and then dried in vacuum at about 100° C. for about 24 hours.

Each of the example and comparative negative electrodes was used in a half cell. Microporous tri-layered polypropylene (PP) and polyethylene (PE) polymer membranes (CELGARD 2032, available from Celgard) were used as the separators. Two types electrolyte for the RF coated Si—Li cell and the oxygen-free, fluorene-base polymer coated Si—Li cell have been used: for comparative example 3 and example 4: 1M LiPF$_6$-DMC:FEC with dimethyl carbonate (DMC) and fluoroethylene carbonate (FEC) at a volume ratio of 4:1 or for comparative example 1 and example 2: 1M LiPF$_6$-EC:EMC+10% FEC with ethylene carbonate (EC) and ethylmethyl carbonate (EMC) at a volume ratio of 1:2 and 10% fluoroethylene carbonate (FEC).

Figure 6:
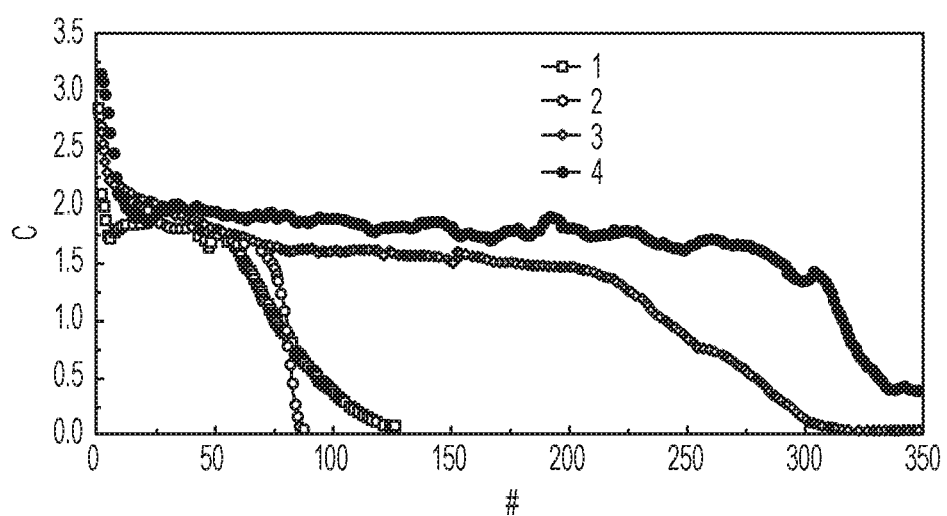
FIG. 6 is a graph illustrating the capacity retention (Y axis) versus the cycle number (X axis) of three comparative batteries and an example battery with a negative electrode including an example of the carbon coated silicon nanoparticles disclosed herein.

The test conditions for the example and comparative cells were: room temperature; current=500 μA; and voltage window ranging from 50 mV to 1.0 V. The capacity retention results are shown in FIG. 6. In FIG. 6, the left Y axis, labeled "C," represents the capacity retention (in mAh), and the X axis, labeled "#," represents the cycle number.

As illustrated in FIG. 6, throughout the cycles, the capacity retention of the example cells (labeled "2" and "4") was generally higher than the capacity retention of the respective comparative cells (labeled "1" and "3") that were formed with the same electrolyte. Comparative example 1 and example 2 were prepared using an inferior electrolyte (i.e., 1M LiPF6-EC:EMC+10% FEC), and the difference in performance between the comparative example and the example is more evident with the improved electrolyte (i.e., 1M LiPF$_6$-DMC:FEC). Clearly, the performance of comparative example 3 was not as good as the performance of example 4, both of which were formed with the improved electrolyte. However, it is noted that example 2 did perform better than comparative example 1 for 75 cycles, even with the inferior electrolyte.

Further, the example cell 4 showed improved first cycle efficiency over the first cycle efficiency of the comparative example cell 3 (RF coated Si). The first cycle efficiency of the example cell 4 (oxygen-free, fluorene-base polymer coated Si) was 75%. The first cycle efficiency of third comparative cell 3 was 69%.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 650° C. to about 750° C. should be interpreted to include not only the explicitly recited limits of from about 650° C. to about 750° C., but also to include individual values, such as 675° C., 685.5° C., 725° C., etc., and sub-ranges, such as from about 700.25° C. to about 728° C., etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A negative electrode, comprising silicon nanoparticles having a carbon coating thereon, the carbon coating having an oxygen-free structure including pentagon rings, and including a plurality of pores, wherein a pore volume of the carbon coating ranges from about 0.1 cm$^3$/g to about 0.5 cm$^3$/g.

2. The negative electrode as defined in claim 1 wherein the oxygen-free structure further includes heptagon rings.

3. The negative electrode as defined in claim 1 wherein the carbon coating has a surface area ranging from about 50 m$^2$/g to about 300 m$^2$/g.

4. The negative electrode as defined in claim 1 wherein the negative electrode further comprises:
   a binder mixed with the silicon nanoparticles having the carbon coating thereon; and
   a conductive filler mixed with the silicon nanoparticles having the carbon coating thereon.

5. The negative electrode as defined in claim 4 wherein:
   the silicon nanoparticles having the carbon coating thereon are present in an amount ranging from about 5 wt % to about 95 wt % based on a total wt % of the negative electrode;
   the binder is present in an amount ranging from about 1 wt % to about 20 wt % based on the total wt % of the negative electrode; and
   the conductive filler is present in an amount ranging from about 1 wt % to about 20 wt % based on the total wt % of the negative electrode.

6. The negative electrode as defined in claim 4 wherein the negative electrode further comprises an active material selected from the group consisting of graphite, tin, alloys of tin, antimony, alloys of antimony, crystalline silicon, amorphous silicon, silicon oxide, and silicon alloys, and wherein the active material is mixed with the silicon nanoparticles having the carbon coating thereon.

7. The negative electrode as defined in claim 6 wherein:
   the silicon nanoparticles having the carbon coating thereon are present in an amount ranging from about 5 wt % to about 75 wt % based on a total wt % of the negative electrode;

the binder is present in an amount ranging from about 1 wt % to about 20 wt % based on the total wt % of the negative electrode;

the conductive filler is present in an amount ranging from about 1 wt % to about 20 wt % based on the total wt % of the negative electrode; and the active material is present in an amount ranging from about 50 wt % to about 95 wt % based on a total wt % of the negative electrode.

8. The negative electrode as defined in claim 1 wherein the silicon nanoparticles having the carbon coating thereon have a particle size ranging from about 30 nm to about 100 nm.

9. The negative electrode as defined in claim 1 wherein the carbon coating has a thickness ranging from about 1 nm to about 10 nm.

10. The negative electrode as defined in claim 1 about 80% of the pores of the plurality of pores are meso-sized.

11. A lithium-based battery, comprising:
a negative electrode, including silicon nanoparticles having a carbon coating thereon, the carbon coating having an oxygen-free structure including pentagon rings, and including a plurality of pores, wherein a pore volume of the carbon coating ranges from about 0.1 cm$^3$/g to about 0.5 cm$^3$/g;

a positive electrode; and a microporous polymer separator soaked in an electrolyte solution, the microporous polymer separator being disposed between the positive electrode and the negative electrode.

12. The lithium-based battery as defined in claim 11 wherein the electrolyte solution is 1M LiPF$_6$-DMC:FEC with dimethyl carbonate (DMC) and fluoroethylene carbonate (FEC) at a volume ratio of 4:1.

13. The lithium-based battery as defined in claim 12 wherein one of:

the lithium-based battery has a loading of the silicon nanoparticles having the carbon coating thereon of about 1.5 mg/cm$^2$, and a stable cycling performance for about 300 cycles; or the lithium-based battery has a loading of the silicon nanoparticles having the carbon coating thereon of about 0.5 mg/cm$^2$, and a stable cycling performance for about 1,000 cycles.

14. A method, comprising:
providing silicon nanoparticles;

applying a carbon precursor on the silicon nanoparticles, the carbon precursor being an oxygen-free, fluorene-based polymer; and then heating the silicon nanoparticles in an inert gas atmosphere, thereby forming a carbon coating on the silicon nanoparticles, the carbon coating having an oxygen-free structure including pentagon rings, and including a plurality of pores, wherein a pore volume of the carbon coating ranges from about 0.1 cm$^3$/g to about 0.5 cm$^3$/g.

15. The method as defined in claim 14 wherein the oxygen-free, fluorene-based polymer includes an allyl group.

16. The method as defined in claim 14 wherein the applying of the carbon precursor on the silicon nanoparticles is accomplished by:

mixing the carbon precursor, the silicon nanoparticles, and a solvent to form a slurry; and drying the slurry.

17. The method as defined in claim 14 wherein a weight ratio of the carbon precursor to silicon nanoparticles is 1:5.

18. The method as defined in claim 14 wherein the heating of the silicon nanoparticles is accomplished at a temperature ranging from about 650° C. to about 750° C. for a time period ranging from about 1 hour to about 10 hours.

19. The method as defined in claim 14, further comprising:

dry mixing the silicon nanoparticles having the carbon coating thereon into a mixture, the mixture including a conductive filler;

adding a binder and a solvent to the mixture;

mixing the mixture to form a slurry;

depositing the slurry onto a support; and drying the slurry.

20. The method as defined in claim 19, further comprising adding an active material to the mixture, the active material being selected from the group consisting of graphite, tin, alloys of tin, antimony, alloys of antimony, crystalline silicon, amorphous silicon, silicon oxide, and silicon alloys.

* * * * *